Aug. 20, 1968 G. NEIROTTI ET AL 3,398,011

METHOD OF LUBRICATING A COATED MAGNETIC RECORD MEMBER

Filed Sept. 10, 1964

INVENTORS:
GUIDO NEIROTTI
EDWARD SCHMIDT

BY

Curtis, Morris & Safford.
ATTORNEYS.

3,398,011
METHOD OF LUBRICATING A COATED MAGNETIC RECORD MEMBER

Guido Neirotti, New Fairfield, Conn., and Edward Schmidt, Pound Ridge, N.Y., assignors to Reeves Industries, Inc., New York, N.Y.

Filed Sept. 10, 1964, Ser. No. 395,987
14 Claims. (Cl. 117—65.2)

ABSTRACT OF THE DISCLOSURE

Method of lubricating a coated magnetic record member by application thereto of a lubricant in a carrier liquid and compressive rolling thereof prior to removal of the carrier liquid to leave the lubricant as a residue.

Figure 1:
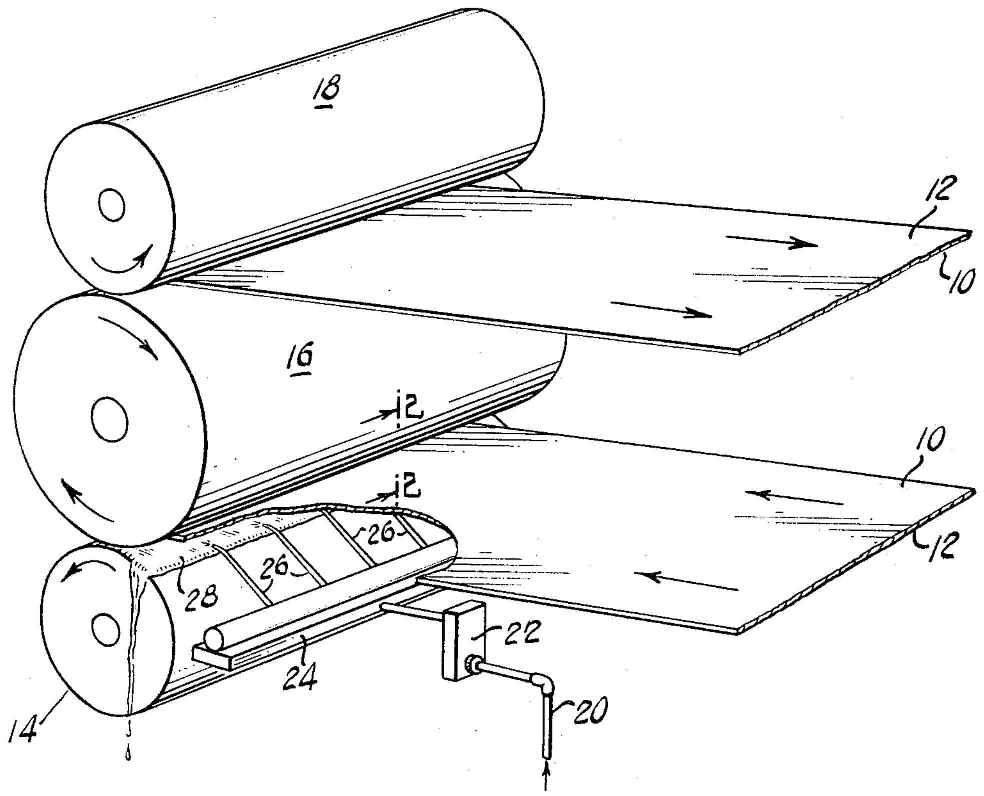

This invention relates to magnetic record members; it provides record members having superior wear characteristics, long life, low abrasion and a high degree of smoothness. More particularly, this invention relates to magnetic tape especially well adapted for use in computers, video tape recorders, and other applications in which service conditions are unusually severe.

In the modern practice of making magnetic tape, small particles of gamma ferric oxide pigment (in the micron size range) are dispersed in a polymeric resinous binder material such as polyvinyl chloride acetate which is dissolved in volatile solvents. Other magnetizable particles may also be used instead of gamma ferric oxide, such as ferroso-ferric oxide ($Fe_3O_4$); preferably all magnetizable particles are of acicular or needle-like form. The dispersion containing the magnetic particles then is coated on a base or carrier of plastic such as cellulose acetate or polyester (e.g. Du Pont "Mylar"), the particles are oriented in a suitable magnetic field, and the dispersion is dried. This leaves a thin dry coating of magnetic particles bound to the surface of the carrier by the resin binder material. The coating typically is less than 0.5 mil (i.e. less than 0.0005 inch) in thickness. Various other materials are frequently incorporated into the magnetic particle-resin dispersion, prominent among such other components being minor percentages of lubricants whose purpose is to reduce friction between the tape and the recorder heads.

The above-described conventional magnetic tapes have many disadvantages especially when they are used under the unusually severe service conditions provided by computers and video tape recorders. The best lubricated and unlubricated tapes wear out rapidly when used in such applications. Typically, in such tapes, there is a loss of signal or "dropout" long before the plastic base material of the tape deteriorates.

Conventional tapes are highly abrasive and cause extremely rapid wear of the expensive recording heads which rub against the tape. This problem is especially severe in video recording in which the recording heads are very expensive and, due to wearing caused by the usual video tape, must be replaced or rebuilt after only 100 or 200 hours of use.

Another problem with such prior tape is that it tends to encourage the formation of "pancakes" or flattened globules of oxide which become permanently attached to the tape surface during replay. These pancakes thus are permanent defects in the tape which seriously impair its performance.

Still another problem is that such prior tapes are not ideally smooth. Smoothness is a factor important in all magnetic records, but it is especially important in video recording tape where any surface roughness gives a low video signal level and often creates amplitude modulation and resulting electrical "noise" in the video signal. What is more, such prior tapes have little resistance to scratching. Thus, objectionable longitudinal scratches often appear in the usual video tape after only five or ten replays, thus further increasing the roughness of the tape.

Another and related problem is that when such conventional tape is run through recorders at a high rate of speed, it often suffers a considerable rise in temperature, thus tending to accelerate the deterioration of the tape.

It is desired in magnetic tape manufacture to have the individual particles of oxide in the finished tape separated one from another and aligned with their longitudinal axes parallel to the base surface. However, in practice many particles become aligned perpendiculary and gather in clumps, thus forming "tufts" on the tape surface. Thus, the coating surface has alternating clumps and voids, with the clumps forming microscopic protrusions on the coated side of the tape; this, of course, prevents obtaining optimum smoothness of the tape. Prior attempts to smooth out these irregularities by dry-calendering or rolling have been ineffective. Moreover, contaminants and dirt may be embossed or embedded into the oxide coating during such calendering or rolling.

As mentioned above, lubricants have been used in some prior tapes in an attempt to solve some of the above problems. However, such use of lubricants has been accompanied by various disadvantages and difficulties.

A typical prior art tape lubricating technique, such as that shown in U.S. Patent 2,654,681, has been to add the lubricant to the particle-resin dispersion while it is still in liquid form. This technique, while generally regarded as satisfactory for mild service tape, has particular disadvantages. For example, even with the most desirable lubricant materials, it has been necessary to incorporate a significant, albeit minor, percentage of the lubricant into the resinous dispersion. In a typical example of such technique, as much as 2 to 3% of lubricant (based on the dry weight of the tape coating) may be used in order to obtain any noticeable lubrication. In such tapes the dispersed lubricant may, on the one hand, migrate to the tape backing and deleteriously affect the anchorage or adhesion of the magnetizable coating to the tape backing and, on the other hand, may "bloom" or migrate to the surface of the coating in excessive amounts thus preventing intimate contact between the recorder head and the magnetic particles in the tape. Furthermore, since the wet coating mixture usually contains a number of different components such as binders, surfactants, plasticizers and solvents, there is serious danger that the lubricant will react chemically with one or more of those components. Such a chemical reaction usually results in inferior magnetic tape having a multitude of undesirable features. Thus, the lubricant used in such a method must be selected carefully so as to avoid such chemical reactions, and the coating process must be carefully controlled to minimize the possibility that such reactions will occur.

Attempts have been made in the past to apply lubricants and lubricating coatings to finished tapes, i.e. after the oxide coating has dried, by various methods such as spreading or spraying. Such methods also frequently cause difficulty, in some instances actually increasing the friction between the recorder heads and the tape, and in other instances deleteriously affecting the aging characteristics of the tape. Such methods often give the tape poor signal resolution and electrical sensitivity and generally have been considered to be unsuccessful.

It is an object of this invention to overcome the above-mentioned disadvantages and difficulties. It is a further object of this invention to provide magnetic record members such as tape especially adapted for use in severe service applications, such as in computers and video recorders. It is still another object of this invention to provide magnetic tape which has an extremely smooth and non-abrasive surface with a low coefficient of friction, has a notably long life, and is relatively free from "dropouts" and "pancaking." It is yet another object of this invention to provide magnetic tape or sheets, the oxide coating of which is highly resistant to scratching, lubricant blooming, and excessive temperature rise due to the abrasive action of the tape rubbing against the recorder heads.

These objects as well as others are achieved with startling success by taking an approach directly opposite to that taught by those successful in the past in producing lubricated magnetic tapes. Instead of incorporating the lubricant into the wet coating mixture, in the present invention the lubricant is introduced into the dry coating. Instead of increasing the amount of lubricant in the tape to give greater lubrication, in the present invention the amount of lubricant is reduced far below normal levels and well below the lowest levels previously even remotely contemplated. Thus, the present invention provides a tape with a highly-polished magnetizable oxide coating which contains, typically, less than 1% lubricant (based on the weight of the dry coating), as little as 0.025%, and preferably around 0.25% lubricant. Such lubricant is not dispersed in the wet oxide mixture, nor is it applied to the dry oxide surface in a manner tending to reduce the electrical sensitivity and signal resolution capability of the tape. Instead, the lubricant is injected into the minute openings in the dry coating of the tape. Tape made according to this invention wears several times longer than the best commercial video and computer tape previously known.

In making record members or tape according to the present invention, the oxide and resin mixture is thoroughly dispersed in suitable mixing equipment, such equipment being known and its description being considered unnecessary. It is to be noted that no lubricant is added to the resin-oxide mix, thus ensuring best anchorage of the oxide-resin mixture to the plastic carrier. Thereafter the resin-oxide mixture is coated on the tape backing to yield a final dry oxide-resin coating of the desired thickness. Since the lubricant is not added to the wet mix, the danger of adverse chemical reaction is avoided. Thus, a wider choice of lubricants is available and the oxide coating process need not be controlled as closely. The oxide coating then is dried in the usual way. The tape then is lubricated and polished in the manner described below.

Figure 2:
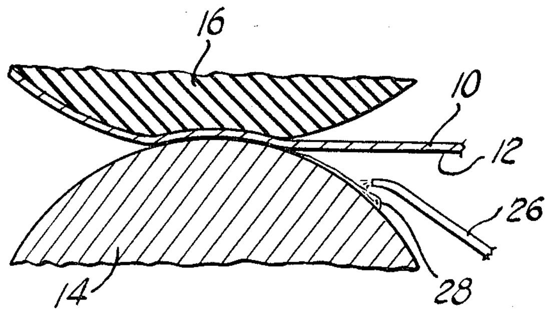

In the drawings:

FIGURE 1 is a perspective, partially broken-away and partially schematic view of apparatus used to perform the preferred lubrication and polishing method of the present invention; and FIGURE 2 is a cross-sectional view taken along line 2—2 of FIGURE 1.

Referring to FIGURE 1 of the drawings, a sheet 10 of plastic base material bearing a dry resin-oxide coating 12 produced in the manner described above is fed, with its coated surface facing down, between a pair of calendering rolls 14 and 16, around the large roll 16, and between roll 16 and another calendering roll 18.

Rolls 14 and 18 preferably are mirror-finished chrome-plated rolls, and are heated by internally-supplied hot oil. Roll 16 preferably is made of rubber or a similar pliable substance secured onto a steel core. Roll 16 is cooled internally to prevent the rubber from separating from the steel core, but it should be understood that the preferred rubber surface of roll 16 is heated by rolls 14 and 18 and is hot during the lubricating and polishing process. The hardness of the surface of roll 16 preferably is from 75 to 95 Durometer (measured on a Shore A–2 device).

A lubricant mixture is fed under pressure from a supply (not shown) through an inlet supply pipe 20 to a pressure reducer and flowmeter unit 22. The mixture is supplied from unit 22 at a relatively low pressure to a plurality of spray nozzles 26. Spray nozzles 26 spray the mixture in accurately-metered amounts onto the surface of roller 14 at a position near the nip between rolls 14 and 16. Nozzles 26 supply the lubricating liquid at a rate such that a "bead" or puddle 28 of lubricating liquid constantly is maintained along the length of roll 14. This puddle 28 extends forwardly to the nip between rolls 14 and 16. It is believed that this liquid bead 28 is maintained on the mirror-finished roller surface by the combined forces of surface tension of the liquid, interface tensions between the liquid and the coating 12, and the rolling friction of the roll 14. Thus, at the nip between rolls 14 and 16, the puddle is of even thickness along the length of the rolls despite the fact that the liquid is supplied from several separate nozzles. This results in highly uniform application of the lubricant mixture to the coating 12. Since the puddle 28 is relatively shallow at the nip between rolls 14 and 16, the mixture is applied to the coating a very short time before the sheet 10 enters the nip, thus minimizing drying of the liquid before entering the rolls.

The maintenance of the bead 28 of liquid on roll 14 provides a further important unexpected advantage in that foreign matter such as dirt and oxide particles is prevented from entering the nip of the rolls and being embedded in the oxide surface. Such particles are washed off the coating 12 and are held in suspension within the deep portion of the liquid bead 28, away from the nip between rolls 14 and 16. These particles migrate to the ends of roll 14 under the force of the liquid flow supplied by nozzles 26 in the central portion of the bead. The flow rate of the liquid deliberately is made greater than that necessary to supply lubricant to the coating so that the excess liquid escapes from the puddle 28 and flows over the ends of roll 14. This overflow carries the foreign particles with it, thus automatically cleaning the puddle. If desired, a suction device can be provided to remove the contaminated liquid at each end of roll 14. Since the rolls are substantially longer than the width of sheet 10, the liquid at the ends of bead 28, which has the highest concentration of impurities, does not contact the sheet.

This washing effect is believed to greatly improve the tape since it prevents the foreign particles from becoming embedded in the tape under the pressure of the calendering rolls, thus ensuring the ultimate in tape surface smoothness and performance.

The rolls 14 and 18 preferably are heated to about 215° F. and rotate at speeds adapted to move sheet 10 at a speed of around 200 feet per minute. Usable roll temperatures range from about 100° F. up to the temperatures at which the base or coating components are damaged. With some base materials presently available, temperatures up to 450° F. are possible. The roll speed preferably ranges from 100 to 300 feet per minute. The pressure between roll 16 and each of rolls 14 and 18 is between about 200 and 10,000 pounds per linear inch. Preferably this pressure is from 1,000 to 1,500 pounds per linear inch.

The above-described process is a combined liquid-polishing and hydraulic lubricating process. The liquid polishing action is accomplished by applying enough pressure between the calendering rolls so that the rubber roll surface is depressed as shown in FIGURE 2. The oxide coated surface 12 of sheet 10, which follows the contour of the depression in the rubber roll, slides with respect to the surface of each metal roll 14 and 18 so that the coating is rubbed and polished to a high gloss. The presence of the lubricant liquid on the coating is believed to be an important feature of this polishing process. Heating the coating makes the coating more plastic and improves the polishing action. The hydraulic lubricating action is believed to comprise injection of the lubricating liquid into the pores or openings in coating 12 by subjecting the liquid to substantial hydraulic pressures.

The heat of the calendering rolls evaporates the volatile components of the lubricant mixture in the tape and leaves the lubricant permanently dispersed in the tape coating. The surface of coating 12, after being twice polished by the rolls, is extremely clean, lustrous, permanently lubricated and very smooth. The coating has a low coefficient of friction at high tape speeds, has greatly improved resistance to abrasion and scratching, and is extremely long-wearing.

By means of the polishing and lubricating method described above, the lubricant is thoroughly dispersed in the pores of the oxide coating 12, but, it is believed, the lubricant is free to travel, by capillary or other action, to the surface in amounts sufficient to significantly reduce the coefficient of friction of the coating surface, but not large enough to affect the electrical or other characteristics of the tape. Contrary to what would be expected from the teaching of the prior art, the lubricant does not interfere with the anchorage of the resin binder to the plastic tape. Also contrary to what would be expected from the teachings of the prior art, the significantly smaller quantities of lubricant present in the tape give lubricating effects far superior to those obtained in conventional tapes.

Although the above-described calendering method has decided advantages, it should be understood that the lubricant material itself and the magnetic member also are significant features of this invention. Accordingly, the lubricant may be applied to the magnetic member by any of a number of known means of applying a liquid onto a sheet, such as by roller-dipping, gravure, or by other known methods.

The lubricant mixture applied to the magnetic member may be pure lubricant, but it preferably includes a volatile carrier for the lubricant. The lubricant enters the pores of the coating, either alone or with the carrier, and becomes intimately distributed in the material of the coating. When the carrier in a lubricant-carrier composition is evaporated, the lubricant is left as a residue intimately dispersed in the coating.

It is desirable to add a swelling agent to the lubricant mixture. This agent causes the binder to swell, thus enlarging its pores and increasing the degree of penetration of the lubricant and carrier into the oxide coating.

Many different types of lubricants can be used. In fact, one distinct advantage of this invention is that, because there does not seem to be any chemical reaction between the lubricant and the dry oxide coating, a wide variety of lubricants can be used.

The preferred lubricants belong to the groups of aliphatic monoesters, including saturated or mono-unsaturated alkyl ethers of glycolesters, typified by the formulae $C_nH_{2n}O_2$; $C_nH(2_{n-2})O_2$; and $C_nH(2_{n-2})O_3$, in which $n$ can have a value of from 14 to 26, but preferably is from 18 to 22. Examples of suitable members of these groups include n-butyl laurate; butoxy ethyl laurate; n-butyl palmitate; methoxy ethyl palmitate; n-butyl stearate; methoxy ethyl stearate; butoxy ethyl stearate; n-butyl oleate; methoxy ethyl oleate; tetrahydrafurfuryl oleate; butoxy ethyl oleate; and n-butyl ricinoleate.

Many lubricants known as "mold release" lubricants also can be used. Sperm oils also can be used. Also suitable are the products of esterification with aliphatic chains of polysubstituted siloxanes, for example, the stearyl ester of dimethyl polysiloxane, at least one form of which is sold commercially as Dow-Corning F-157 oil.

Some fluorinated compounds, such as the polymers of tri fluorovinyl chloride sold as "Fluorolubes" by Hooker Chemical Corp. also are satisfactory.

A dispersion or emulsion of a finely-divided solid lubricant also is suitable and is highly advantageous in applications such as "slant-track" video recording in which the tape must pass relatively slowly over the surface of a mandrel while being scanned relatively rapidly by video recorder heads. Low-solubility fluorinated compounds are highly satisfactory lubricants for such purposes. For example, a 20% dispersion of trichlorotrifluoroethane particles ($CCl_2F$-$CClF_2$) dispersed in "Freon," sold under the trademark "Vydax" by Du Pont, has been found suitable. The size of solid particles in this dispersion is around 5 microns, but is advantageously reduced to from ½ to 1 micron. Other fluorinated solids of low solubility such as TFE fluorocarbons can be used in the same manner.

A number of suitable liquid carriers is available. The carrier should be capable of dissolving or forming an emulsion with the lubricant. It should not attack the tape materials, and should not boil at the rool temperatures used in the process. It should have an evaporation rate such that the tape is dry when it emerges from between the upper roll 18 and central roll 16. Just a few of the many suitable carriers are: methyl, isopropyl and ethyl alcohols; "Solox," a product of U.S. Industrial Chemical Co. (said to comprise approximately 100 parts denatured ethyl alcohol #11, 1 part ethyl acetate, 1 part aviation gasoline, and 2 parts denaturing grade methyl alcohol); medium evaporation rate petroleum aromatics such as toluol, xylol, "Solvesso 100" and "Solvesso 150," both made by Esso Division of Humble Oil Corp., etc.; aliphatics such as mineral spirits, heptane, V.M.& P. Naphtha, etc.; "Freon," and water.

The swelling agent should have the same properties as the carrier (and, in fact, can serve as a carrier), except that it should attack and slightly swell the binder material. Many substances are known for performing this function, the particular agent to be chosen depending upon the particular binder used in the tape coating. If the binder is highly soluble, or has a low softening temperature, either a mild agent or no swelling agent should be used. Examples of swelling agents suitable for various binders are: mild agents such as ethyl, butyl and amyl acetates, and chlorinated solvents such as carbon tetrachloride; medium-mild agents such as the lower ketones including acetone, methyl ketone and methyl isobutyl ketone; and strong agents such as tetrahydrofurane and dioxane.

The amount of lubricant left as a residue in the oxide-resin coating of the tape depends upon the lubricant concentration in the lubricant mixture. A concentration of around 10% (by volume) lubricant has proved best suited for most severe-service magnetic tapes. This concentration typically gives a tape having 0.24% lubricant, based on the dry weight of the coating components, or 0.32% of the weight of thhe iron oxide particles in the coating. Varying the lubricant concentration gives suitable performing tapes having from 0.025% to 1% lubricant based on the weight of the dry coating components. The area concentration can range from approximately 1 to 10 milligrams of lubricant per square foot of tape, a range very substantially lower than any known to be used in previous tapes.

It is believed that the impressive performance of tape made in accordance with the present invention is at least partially a result of the use of such low lubricant concentrations in the tape. The above-described lubricant injection method is at least partially responsible for making it possible to use such low lubricant concentrations. In prior methods in which the lubricant is introduced into the fluid coating mixture, it is believed that some of the lubricant is trapped in the oxide-binder boundary regions and cannot easily get to the coating surface. In the novel impregnated tape of the present invention, the lubricant is not trapped in this manner and is used most efficiently and at a rate such that the electrical characteristics of the tape are not noticeably affected by the lubricant.

Various features of the present invention are further illustrated by the following specific examples:

EXAMPLE 1

A sample of magnetic tape was prepared by coating a paint-like mixture of $Fe_2O_3$ pigment and polymeric binder dissolved in suitable organic solvents on "Mylar" polyester film 1 mil thick. The solvents were removed by evaporation, thus leaving on the film a dry magnetic coating having a thickness of 0.4 mil. The coated film then was passed through calendering apparatus similar to that shown in the drawings. The metal roller surfaces were oil-heated to 215° F., and the pressure between the rollers was about 6,600 pounds per linear inch. The film was passed through the calendering rolls at a speed of approximately one hundred feet per minute.

A lubricant mixture containing ten percent (by volume) lubricant was prepared with the following composition:

| | Grams |
|---|---|
| Butyl Cellosolve stearate (butyoxy ethyl stearate) | 286.7 |
| Methyl isobutyl ketone | 516.2 |
| Xylol | 2064.6 |

In the above composition the xylol and methyl isobutyl ketone are carriers for the butyl cellosolve stearate lubricant. The methyl isobutyl ketone is used also as a swelling agent.

The above mixture then was applied to the tape in the manner described above, i.e. by forming the mixture into a liquid "bead" at the first nip of the calendering rolls.

The resulting lubricated magnetic tape had about 0.24% (based on total weight of solids) lubricant in the coating. The tape was found to have a high degree of smoothness, a low coefficient of friction, greatly improved resistance to scratching, water repellency, and was substantially odorless.

EXAMPLE 2

Magnetic tape was made substantially as described in Example 1 except that the lubricant mixture comprised 10% (by volume) butyl Cellusolve stearate lubricant and 90% "Solox" carrier. No swelling agent was used.

The roll pressures were maintained between 1,000 and 1,500 pounds per linear inch while the lubricant mixture was being applied and dried. The tape then was passed through the calendering rolls again without application of liquid lubricant, with roll pressures of about 2,500 pounds per linear inch. This step produced further polishing of the tape, and, surprisingly, did not produce the embeeded oxide particles and other defects of the usual dry calendering attempts on ordinary tapes. The resulting tape had properties substantially the same as those of the Example 1 tape.

The results of the following tests performed on magnetic tape made in accordance with the present invention indicate its truly superior qualities:

I. Computer tape wear tests

A length of ½ inch wide magnetic tape made in accordance with the present invention was transported back and forth through a standard computer transport mechanism ("Potter Mark II") at 112.5 inches per second, the standard high speed used in such transports. The message recorded on the tape consisted entirely of digital "ones" written at a density of 200 flux reversals per inch in each of seven parallel tracks. The signals recorded in each of the seven channels were detected by a standard reproducing head, and were amplified by means of a standard adjustable playback amplifier with its gate adjusted to amplify only those signals having an amplitude at least fifty percent as great as the normal estimated signal output level. Special test circuitry was provided by means of which an output signal was provided every time the level of any signal was less than fifty percent of the normal estimated output level. Each of these signals was transmitted to a digital counter which counted the total number of low level signals detected during each pass of the tape through the test mechanism. A certain number of non-repetitive errors occurred during each pass due to such things as small particles of dirt or oxide temporarily blocking the detection of a signal. These non-repetitive errors were ignored. The end of the life of the tape being tested was taken as the point at which repeating errors first occurred. At this point, one or more signals recorded on the tape had become permanently undetectable, that is, it had permanently "dropped out."

Various different types of prior art magnetic tapes were tested in accordance with the foregoing procedures. These prior tapes included tapes reported and believed to be the best tapes available for such uses. The average life of these prior tapes was approximately six thousand to forty thousand passes before repeating errors first occurred.

In contrast, digital tape made in accordance with the present invention had an average life of approximately seventy-five thousand passes, almost twice as many passes as the best prior art tape tested. Furthermore, the tape of the present invention was examined after this test was completed and it was found that the surface of the oxide coating was smooth and free from scratches and "pancake" deposits which could create permanent errors.

II. Video tape wear tests

Video tape made in accordance with the present invention was tested in an "R.C.A." Television Tape Recorder-Model TRT–1A, a "standard" quadruplex video recorder in which four magnetic heads are rotated against the video tape at a speed of 14,400 revolutions per minute. The tape is held firmly against and in intimate contact with the four magnetic herads. This arrangement tends to produce the most severe recording head and video tape wear. Each recording head is only ten mils wide, and the motion of the four recorder heads is similar to that of a miniature buzz saw. Several tests were performed on both standard video tapes and video tape made in accordance with the present invention.

Lengths of standard video tape, i.e., "3M" brand video tape No. 379, and tape made in accordance with the present invention were passed through the above-identified RCA quadruplex recorder one in close succession to the other and the voltage input to the recorder motor required to drive the recording heads at 14,400 revolutions per minute was measured. This voltage is the "video recorder motor voltage" referred to hereinafter. The video recorder motor was a three-phase hysteresis synchronous motor whose input voltage is substantially directly proportional to torque output from the motor. The torque output of the motor is a direct measure of the load placed upon the motor by the rubbing of the recorder heads against the video tape. This, the torque output and, hence, the input voltage of the motor are figures of merit for video tape tested in the recorder.

The following table gives the video recorder motor voltage and video recorder motor torque output for the tapes tested. The torque output was taken from the performance characteristic curve for the recorder motor whereas the voltage was measured directly.

VIDEO RECORDER MOTOR VOLTAGE TABLE

| Tape Tested | Amount Tape Had Been Used | Video Recorder Motor Voltage, in volts | Approximate Video Recorder Motor Torque Output, in inch-ounces |
|---|---|---|---|
| None (Motor Voltage Measured Without Tape). | | 30 | 0 |
| "3M"–379 | New | 44–45 | 1.2 |
| "3M"–379 | 100 passes | 47–48 | 1.5 |
| Applicants' Video Tape | New | 33–34 | 0.3 |
| Do | 100 passes | 33–34 | 0.3 |
| Do | 1,000 passes | 35–36 | 0.4 |
| Do | 2,000 yasses | 36–37 | 0.5 |

Since video recorder heads wear down and change their size during their life, the absolute voltage and torque values for a given video tape will be different at different times in the life of the recorder heads. Of course, the use of recorders other than the one identified above can give different absolute values for these quantities. Hence, a comparison of tape performances in this test should be made only between two tapes tested in the same machine at times very close to one another. Then, the performances can be compared relative to one another.

When the tapes tested as described above are compared in this manner, it is seen that new tape of the present invention has a recorder motor torque output which is around one-fourth of the standard tape. What is more, this difference remains or even increases during the life of the two tapes. Thus, after 100 passes on each tape, the present tape produced a motor torque only one-fifth of that of the standard tape.

Thus, it can be seen that there is significantly less friction between the recording heads and the video tape of this invention than between the same recording heads and standard video tape. This, of course, results in very significant reductions in wear of the recording heads and in longer life for the video tape.

The temperature rise of the surface of tape made in accordance with the present invention was measured as it passed through the video recorder. This temperature was measured by means of a Barnes Engineering Infrared Thermograph, which measures the temperature of a surface without contacting that surface. This instrument measured the temperature of the surface of the tape immediately before and immediately after contact with the recording heads. New "3M"–379 video tape showed a temperature rise of from five to eight degrees Fahrenheit. In contrast, new tape made in accordance with the present invention showed a corresponding temperature rise of only three to five degrees Fahrenheit. The temperature rise experienced with tape of the present invention thus was approximately 40 percent lower than in prior art tapes. Thus, the present video tape is around 40% freer from the rapid aging and other adverse effects of heating.

As was mentioned earlier in this patent application, standard magnetic tapes have an abrasive surface which tends to wear recording heads relatively rapidly. This is especially true in video recording because of the high rotational speed of the recording head and the high pressures between the heads and the video tape. As a result, video heads used with ordinary video tapes have a wear life of around only 200 hours. Impressively, video heads used with applicants' video tape last well over four times as long in use in the same recording equipment, thus providing a great reduction in the very considerable cost of rebuilding or replacing the recorder heads.

As also was mentioned earlier in this patent application, it is important that the surface of video tape be extremely smooth. Roughness results in low video signal level and severe amplitude modulation of the signal. Apparently, there is no standard technique used in measuring surface roughness of magnetic tape. However, surface roughness tests have been performed on typical prior art video tapes and video tapes in accordance with the present invention by means of a "Tallysurf" Model #3 Surface Finish Measuring Instrument manufactured by Taylor, Taylor & Hobson, Leicester, England. This instrument applies a very sharp stylus to the tape and moves it slowly in the transverse and longitudinal directions. The vertical movements of the stylus are recorded on a chart. The average distance between recorded peaks of the resulting graph is measured to give an indication of surface roughness. Samples of standard prior art video recording tape and video tape made in accordance with the present invention both were tested by this means and the results obtained are listed in the table below. The term "average roughness," as used in this application, means roughness measured by the instrument and methods described above.

AVERAGE ROUGHNESS TABLE

| Tape Tested | Amount Tape Had Been Used | Average Longitudinal Roughness (inch) | Average Transverse Roughness (inch) |
|---|---|---|---|
| "3M"–379 | New | 2.2 × 10–6 | 2.2 × 10–6 |
| "3M"–379 | 200 passes | 3.0 × 10–6 | 2.2 × 10–6 |
| Applicants' Video Tape | New | 0.3 × 10–6 | 1.0 × 10–6 |
| Do | 1,000 passes | 0.3 × 10–6 | 0.6 × 00–6 |

The above table indicates that tape in accordance with the present invention is significantly smoother in both the longitudinal and the transverse direction than prior art tapes.

The above description of the invention is intended to be illustrative and not limiting. Various changes or modifications in the embodiments described may occur to those skilled in the art and these can be made without departing from the spirit or scope of the invention as set forth in the claims.

We claim:

1. A method of lubricating a magnetic record member comprising a flexible support of non-magnetic material bearing a porous coating containing finely-divided magnetizable material dispersed in flexible binder material which binds said magnetizable material onto said support, said method comprising the steps of distributing lubricating material in a carrier liquid to form a lubricating liquid, applying said lubricating liquid to the surface of said coating, compressively rolling said record member while its coated surface is wet with said lubricating liquid, and then evaporating said carrier liquid to leave said lubricating material in said coating as a residue at an area concentration of about 1 to 10 milligrams per square foot.

2. A method as in claim 1 in which said rolling step is performed by passing said member between at least one pair of compressing rollers, one of said rollers having a surface elastically deformed and indented by the other of said rollers, and including the step of heating the surface of at least one of said pair of rollers throughout said rolling step.

3. A method as in claim 2 in which the temperature to which said one roller is heated is at least 100° F. and in which said record member moves through said rollers at a speed of from 100 to 300 linear feet per minute.

4. A method as in claim 3 in which said temperature is no greater than 450° F., and in which the pressure between said rollers is between 200 and 10,000 pounds per linear inch.

5. A method of lubricating and polishing a magnetic record member bearing a porous coating containing finely-divded magnetizable material dispersed in flexible binder material which binds said magnetizable material onto said support, said method comprising the steps of applying a lubricating liquid comprising a lubricant and a carrier liquid to the surface of said coating, hydraulically injecting said lubricating liquid into said coating and polishing said coating by passing said member between a pair of compressing rolls while the coated surface of said member is wet with said lubricating liquid, one of said rolls having a relatively pliable surface and the other having a relatively hard, non-pliable surface, the surface of at least one of said rolls being heated, and then evaporating said carrier liquid to leave said lubricant in said coating as a residue at an area concentration of about 1 to 10 milligrams per square foot.

6. A method of lubricating a magnetic record member comprising a flexible support of non-magnetic material bearing a porous coating containing finely-divided magnetizable material dispersed in flexible binder material which binds said magnetizable material onto said support, said method comprising the steps of applying a lubricating liquid comprising a lubricant and a carrier liquid to the surface of said coating, compressively rolling said record member while its coated surface is wet with said lubricating liquid, and then evaporating said carrier liquid to leave said lubricant in said coating as a residue at an area concentration of about 1 to 10 milligrams per square foot.

7. A method as in claim 6 in which said rolling step is performed by passing said member between at least one pair of compressing rollers, one of said rollers having a surface elastically deformed and indented by the other of said rollers, and including the step of heating the surface of at least one of said pair of rollers throughout said rolling step, said lubricating liquid being applied to said coating by spreading said liquid longitudinally along the surface of the one of said rollers which contacts said coating in a manner so as to form and maintain a bead of lubricating liquid on said one roller at the nip between said rollers.

8. A method as in claim 6 in which said lubricating liquid contains a lubricant selected from the group consisting of aliphatic monesters having the formulae $$C_nH_{2n}O_2$$

$C_nH_{(2n-2)}O_2$; and $C_nH_{(2n-2)}O_3$, in which $n$ has a value of from 14 to 26, sperm oil, the products of esterification with aliphatic chains of polysubstituted siloxanes, and fluorinated hydrocarbons.

9. A method as in claim 6 in which said lubricating liquid contains a lubricant selected from the group consisting of n-butyl laurate; butoxy ethyl laurate; n-butyl palmitate; methoxy ethyl palmitate; n-butyl stearate; methoxy ethyl stearate; butoxy ethyl stearate; n-butyl oleate; methoxy ethyl oleate; tetrahydrafurfuryl oleate; butoxy ethyl oleate; and n-butyl ricinoleate.

10. A method as in claim 6 in which said lubricating liquid comprises a dispersion of finely divided trichlorotrifluoroethane particles in a carrier liquid.

11. A method as in claim 6 in which said lubricating liquid comprises a lubricant diluted with a liquid swelling agent which is adapted to swell said binder material to facilitate entry of said lubricating liquid into said coating.

12. A method as in claim 7 in which said lubricating liquid is flowed onto said one roller at positions spaced inwardly from its ends so that there is a flow of liquid in said bead along said one roller from its center towards its ends, and in which said lubricating liquid is flowed onto said one roller at a rate such that said lubricating liquid overflows from said bead at each end of said roller to rinse away waste particles caught in the bead.

13. A method as in claim 9 in which said lubricant is butoxy ethyl stearate.

14. A method of lubricating and polishing a magnetic record member bearing a porous coating containing finely-divided magnetizable material dispersed in flexible binder material which binds said magnetizable material onto said support, said method comprising the steps of distributing lubricating material in a carrier liquid to form a lubricating liquid, applying said lubricating liquid to the surface of said coating, lubricating and polishing said coating by passing said member between a pair of compressing rolls while the coated surface of said member is wet with said lubricating liquid, one of said rolls having a relatively pliable surface and the other having a relatively hard, non-pliable surface, the surface of at least one of said rolls being heated, said lubricating liquid being applied to said one of said rollers in a manner so as to form and maintain a bead of lubricating liquid on said one roller at the nip between said rollers, said one roller being the roller which contacts said coating, said lubricating liquid being flowed onto said one roller at positions spaced inwardly from its ends so that there is a flow of liquid in said bead along said one roller from its center towards its ends, said lubricating liquid being flowed onto said one roller at a rate such that said lubricating liquid overflows from said bead at each end of said roller to rinse away waste particles in the bead, said one roller being substantially longer than the width of said record member and said record member being located centrally between said ends of said one roller so that the portions of said bead bearing the greatest concentration of waste particles do not contact said record member, and passing said record member between another pair of rollers substantially the same as the first named rollers, at least one of said other rollers being heated to aid in evaporating said carrier liquid from said coating to leave said lubricating material in said coating as a residue at an area concentration of 1 to 10 milligrams per square foot.

References Cited

UNITED STATES PATENTS

| | | | |
|---|---|---|---|
| 2,654,681 | 10/1953 | Lueck | 117—161 |
| 2,688,567 | 9/1954 | Franck | 117—64 |
| 2,804,401 | 8/1957 | Cousino | 117—138.8 |
| 3,024,129 | 3/1962 | Brundige | 117—65.2 |
| 3,216,846 | 11/1965 | Hendrick et al. | 117—62 |
| 3,274,111 | 9/1966 | Sada et al. | 252—62.5 |
| 3,276,946 | 10/1966 | Cole et al. | 161—189 |
| 3,293,066 | 12/1966 | Haines | 117—68 |
| 3,318,731 | 5/1967 | Blum | 117—215 |
| 3,319,012 | 5/1967 | Reed et al. | 179—100.2 |

OTHER REFERENCES

Spratt: "Magnetic Tape Recording" (1958), Heywood & Co., Ltd., London, pp. 134.

WILLIAM D. MARTIN, *Primary Examiner.*

W. D. HERRICK, *Assistant Examiner.*